United States Patent
Li et al.

(10) Patent No.: US 12,381,026 B2
(45) Date of Patent: Aug. 5, 2025

(54) SYSTEMS AND METHODS FOR DEMAGNETIZATION OF A PERMANENT MAGNET ROTOR

(71) Applicant: Ford Global Technologies, LLC, Dearborn, MI (US)

(72) Inventors: Wanfeng Li, Novi, MI (US); Franco Leonardi, Dearborn Heights, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 18/334,196

(22) Filed: Jun. 13, 2023

(65) Prior Publication Data
US 2024/0420879 A1    Dec. 19, 2024

(51) Int. Cl.
*H01F 13/00* (2006.01)
*H02P 5/46* (2006.01)

(52) U.S. Cl.
CPC ............ *H01F 13/006* (2013.01); *H02P 5/46* (2013.01)

(58) Field of Classification Search
CPC ........ H02K 21/042; H02K 1/223; H02K 1/24; H02K 1/14; H02K 1/276; H02K 21/22; H02K 1/2766; H02K 21/14; H02K 19/103; H02K 1/26; H02K 1/2773; H02K 15/03; H02K 1/27; H02K 11/33; H02K 21/12; H02K 1/16; H02K 17/12; H02K 1/2706; H02K 1/278; H02K 21/024; H02K 49/043; H02P 1/46; H02P 9/32; H02P 9/12; H02P 9/123; H02P 21/06; H02P 21/14; H02P 21/22; H02P 21/26; H02P 21/32; H02P 25/28; H02P 23/07; H02P 23/18; H02P 25/064; H02P 6/32; H02P 6/08; H02P 25/03; H02P 21/141; H02P 29/662; H02P 2006/045; H02P 21/0089; H02P 2207/05; H02P 21/10; H02P 25/022; H02P 5/00; H02P 25/22; H02P 21/12; H02P 23/009; H02P 27/06; B60L 9/18; H01F 7/0273; H01F 13/006
See application file for complete search history.

(56) References Cited

U.S. PATENT DOCUMENTS

| | | |
|---|---|---|
| 4,283,847 A | 8/1981 | May |
| 5,995,358 A | 11/1999 | Buisson et al. |
| 2011/0234180 A1* | 9/2011 | Cullen .................. H02K 21/16 322/89 |
| 2020/0373873 A1 | 11/2020 | Houshmand et al. |

FOREIGN PATENT DOCUMENTS

| | | |
|---|---|---|
| JP | 2006254699 A | 9/2006 |
| JP | 4884414 B2 | 2/2012 |
| JP | 2012147602 A | 8/2012 |

* cited by examiner

*Primary Examiner* — Antony M Paul
(74) *Attorney, Agent, or Firm* — David Kelley; McCoy Russell LLP

(57) ABSTRACT

Methods and systems for demagnetizing a rotor. The method includes, in one example, adjusting a position of magnetic poles mounted on a frame in a demagnetization system in relation to a first electric machine rotor, and decreasing the magnetization of the first electric machine rotor via operation of the demagnetization system to generate an electromagnetic field.

20 Claims, 7 Drawing Sheets

SYSTEMS AND METHODS FOR DEMAGNETIZATION OF A PERMANENT MAGNET ROTOR

FIELD

The present description relates generally to methods and systems for demagnetizing permanent magnet rotors using an electromagnetic field.

BACKGROUND/SUMMARY

Electric machines that include rare earth permanent magnets are used in many applications, due to their high performance. Mining, separating, and manufacturing the rare earth elements involves many steps and are overall complex processes. As such, recycling of rare earth permanent magnets may be desirable from an efficiency and environmental standpoint.

Some recycling approaches have shredded or melted electric machines before separating rare earth elements from the mixture. However, these recycling approaches are energy intensive and complex. Separating the rare earth permanent magnets from the electric machine rotor core in the recycling process may be more efficient than shredding or melting the entire electric machine. However, due to the strong magnetic field generated by the rare earth permanent magnets, it can be difficult to remove the magnets without demagnetization.

Attempts have been made to demagnetize the rotor in an electric machine recycling process. One example approach is shown by Araki et al. in J.P. 2012-147602 A where a device for demagnetizing and removing permanent magnets from a rotor is described. In Araki's system, the permanent magnets are held in a demagnetization holder and heated up to melt joints and demagnetize magnets for recycling. In Araki's device, induction heating coils of the demagnetization device heats the rotor magnets and the coils are designed for axial adjustment.

However, the inventors herein have recognized potential issues with Araki's system as well as other demagnetization systems. The coils in the Araki's device have a stationary radial position, thereby constraining the applicability of the device. As such, multiple demagnetization devices may be used demagnetize rotors that vary in shape or size. When a facility possesses multiple rotors with various designs and dimensions demagnetization is complex and inefficient. Further, melting the rotor may present difficulties with regard to downstream processing of the rotor components.

In one example, the issues described above may be at least partially addressed by a method for operation of a demagnetization system. The method includes, in one example, adjusting (e.g., radially adjusting) a position of the magnetic poles in relation to an electric machine rotor. Further, the method includes decreasing the magnetization of the electric machine rotor via an electromagnetic field generated by the demagnetization system. In this way, rotors of varying dimensions and designs are able to be efficiently demagnetized by the demagnetization system.

Further in one example, the position of the magnetic poles and/or a current, a frequency, or a duration of the electromagnetic field may be adjusted during demagnetization of the electric machine rotor to increase the efficiency of the demagnetization process. For instance, the magnetic flux of the rotor may be monitored during demagnetization and the current, frequency, or duration of the electromagnetic field may be increased when the magnetic flux exceeds a threshold value. In this way, the efficiency of the demagnetization process is further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for the demagnetization of a permanent magnet rotor of an electric motor. Electric motors, such as traction motors in vehicles, often include permanent magnets (e.g., rare-earth magnets). Once the rotor is no longer in use, it may be desirable to recycle the permanent magnets. In order to efficiently recycle the permanent magnets, a demagnetization system may be used to implement a demagnetization process of the magnets. During the demagnetization process, a rotor is positioned within a demagnetization system. The demagnetization system includes magnetic poles, each of which may be adjusted radially and/or axially to accommodate the rotor. As such, the demagnetization system is able to accommodate rotors with various designs and/or dimensions.

Figure 1:
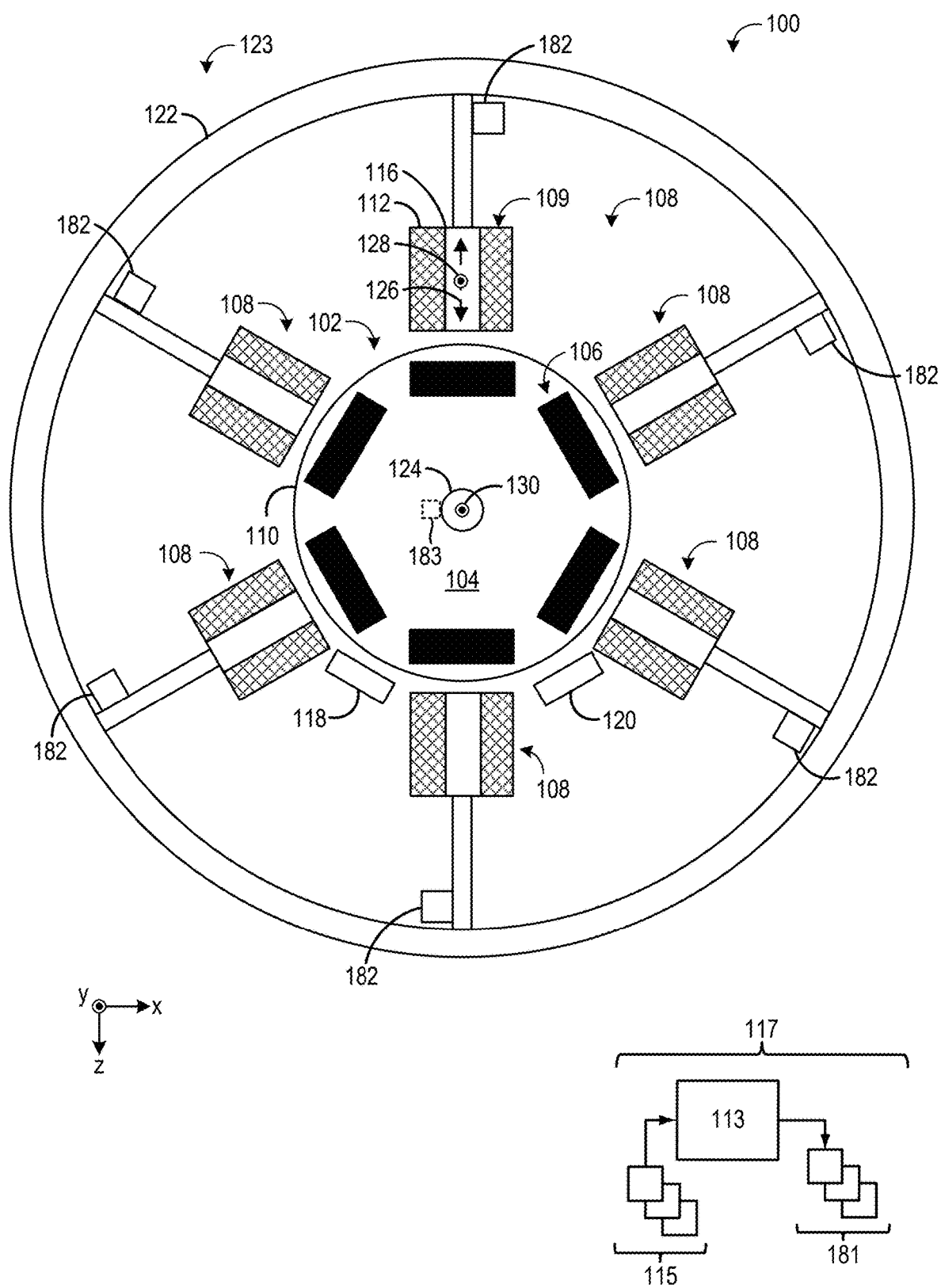
FIG. 1 shows an example demagnetization system positioned to demagnetize a first rotor.
Figure 2:
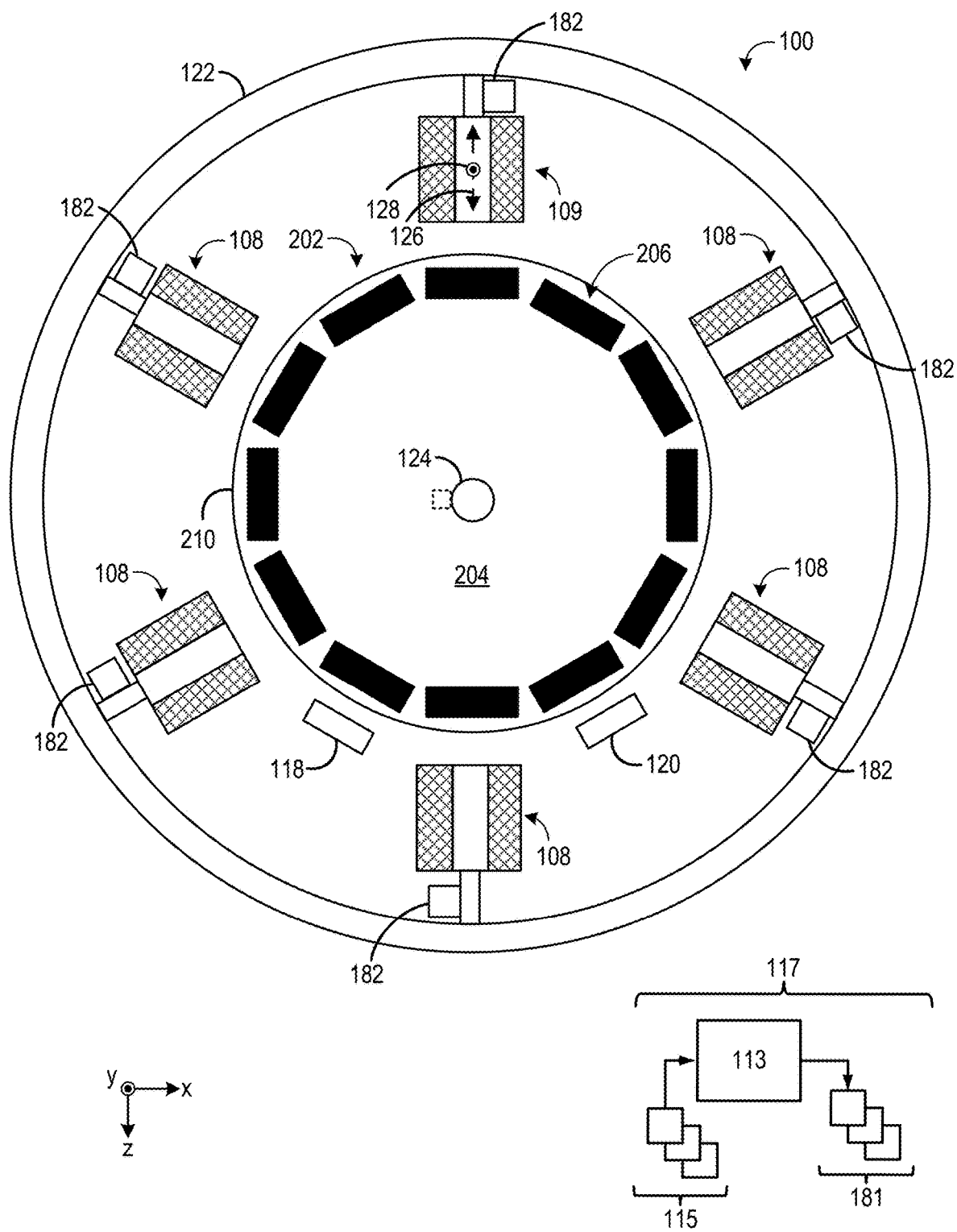
FIG. 2 shows the demagnetization system of FIG. 1 configured to demagnetize a second rotor.
Figure 3:
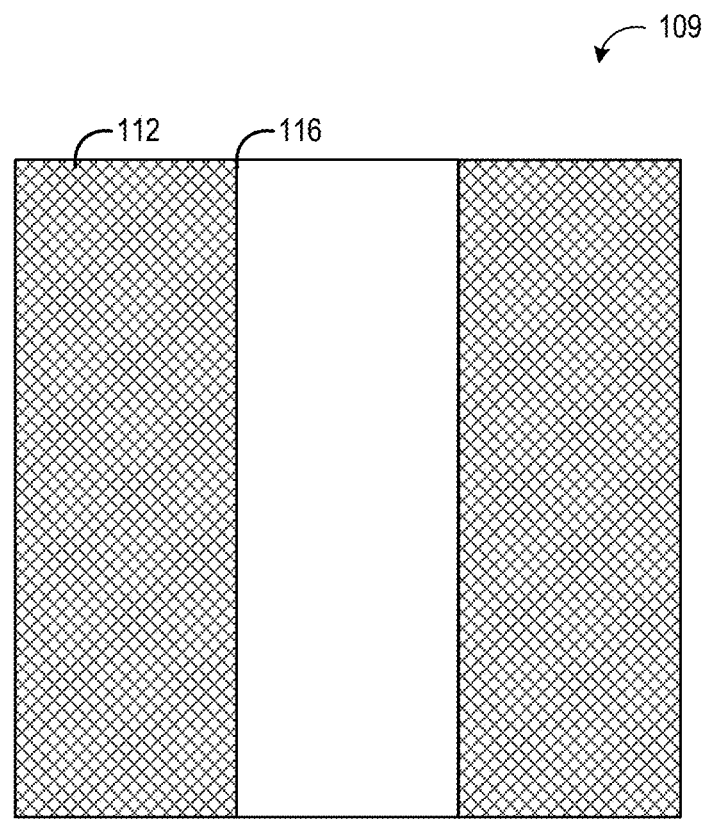
FIG. 3 shows a detailed view of a magnetic pole of the demagnetization system of FIG. 1.
Figure 4:
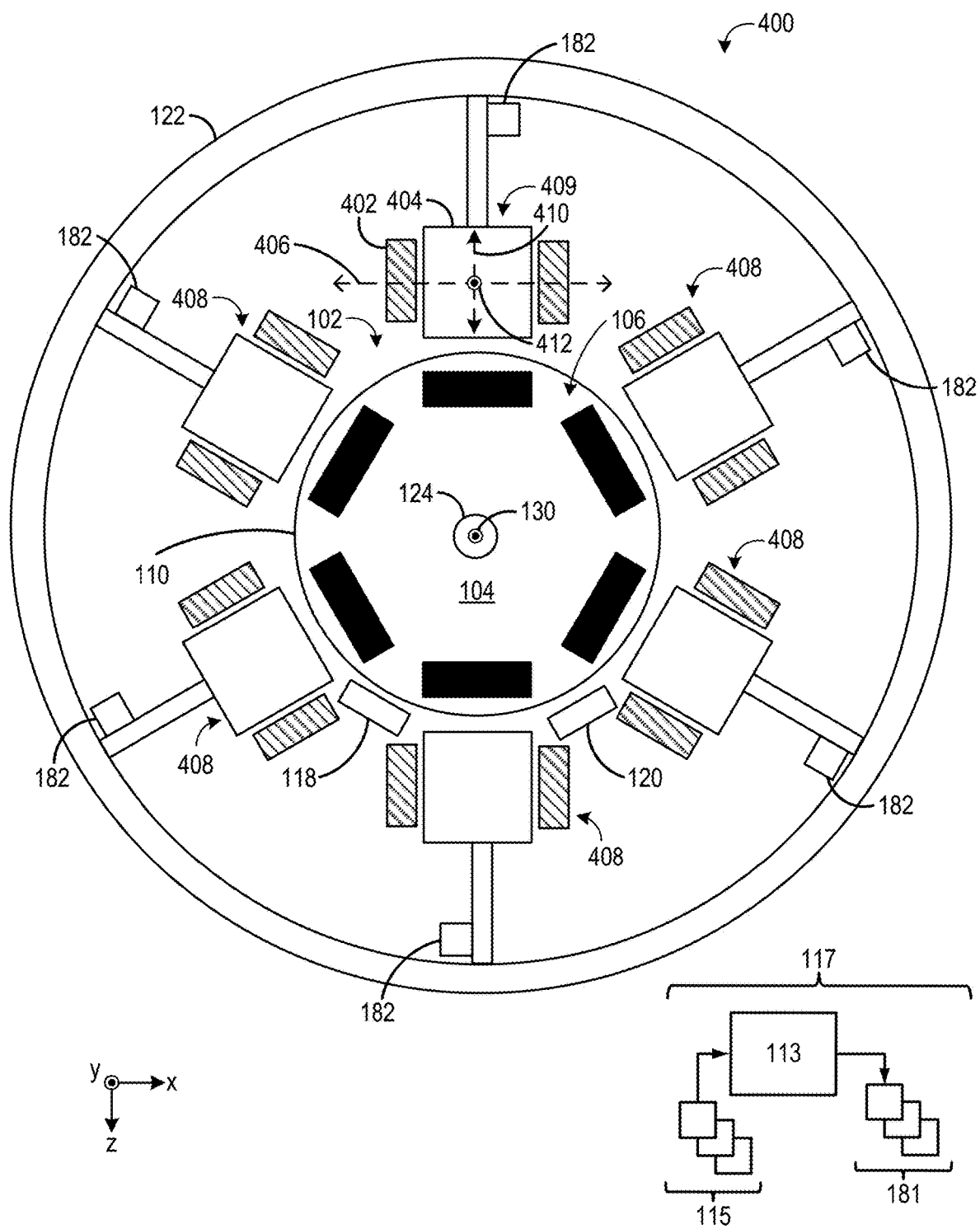
FIG. 4 shows a second example a demagnetization system for demagnetizing a rotor.
Figure 5:
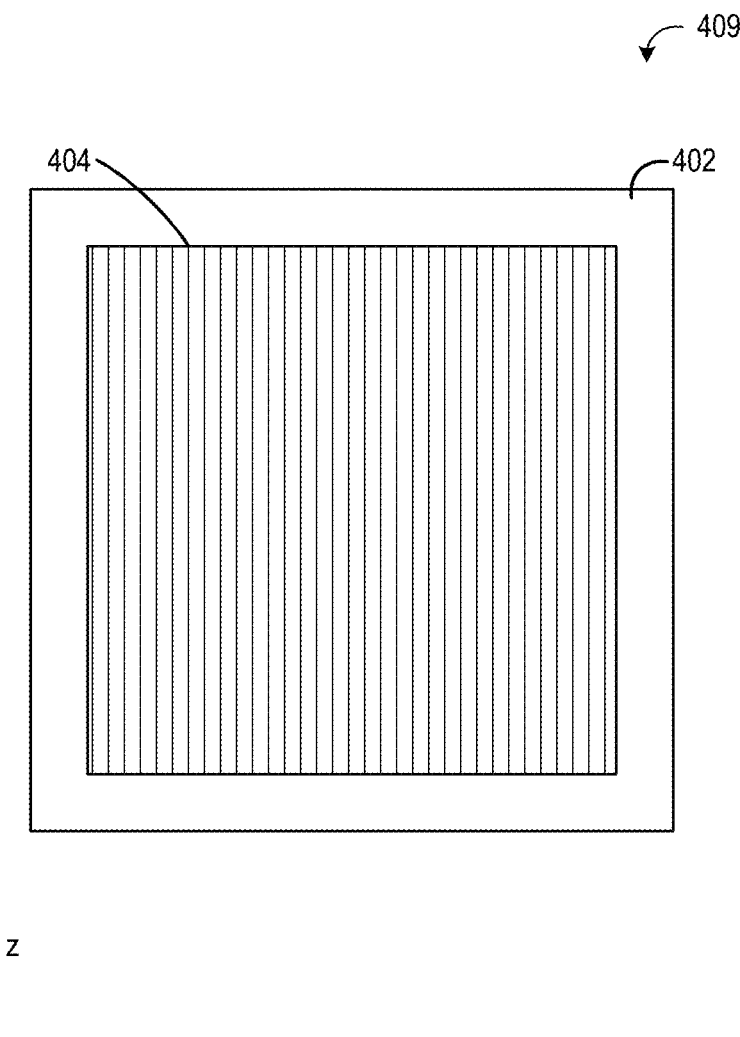
FIG. 5 shows a magnetic pole of the demagnetization system of FIG. 4.

A demagnetization system may be used to decrease the magnetic flux of permanent magnets within the rotor via an electromagnetic field. The demagnetization system may generate an electromagnetic field via the magnetic poles. In some examples, each magnetic pole may include permanent magnets and one or more insulating layers, as shown in FIGS. 1, 2, and 3. As such, the magnetic poles may generate a direct current (DC) electromagnet field. In other examples, each the magnetic poles may each include a coil and a steel lamination, as shown in FIGS. 4 and 5. As such, the magnetic poles may generate a DC electromagnetic field or an alternating current (AC) electromagnetic field, depending on the power supplied to the coils. To demagnetize the rotor in a DC electromagnetic field, the rotor may be rotated relative to the demagnetization system, as described in reference to FIG. 6. Further, to demagnetize the rotor in an AC electromagnetic field, the rotor may remain stationary relative to the demagnetization system, as described in reference to FIG. 7. During demagnetization via a DC electromagnetic field or an AC electromagnetic field, the magnetic poles of the demagnetization system may be adjusted radially and/or axially. Such adjustments may allow the demagnetization system to accommodate structural components of the rotor and/or alter the electromagnetic field to more efficiently demagnetize the rotor.

FIGS. 1-5 include a coordinate system to orient the views. The z-axis may be a vertical axis (e.g., parallel to a gravitational axis), the y-axis may be a longitudinal axis (e.g., horizontal axis), and/or the x-axis may be a lateral axis, in one example. However, the axes may have other orientations, in other examples.

FIG. 1 illustrates an example of a demagnetization system 100 and a rotor 102 of an electric machine. The electric machine may be an electric motor used in a vehicle, such as a traction motor. However, the demagnetization system may be used to demagnetize rotors of a wide variety of electric motors which may be used in a variety of environments including but not limited to factories, machinery, appliances, and the like.

The rotor 102 includes a rotor body 104 and permanent magnets 106. As such, the magnets may have high coercivity and be resistant to changes in magnetization. In some examples, the magnets may be rare earth magnets. For example, the magnets may include neodymium or samarium cobalt. In other examples, the magnets may include alnico or ferrite. It may be desirable to recycle the magnets from an environmental perspective. However, the magnets may generate a strong magnetic field that increases the difficulty of removing the magnets from the rotor body 104 without demagnetization. Further, the permanent magnets may be adhesively bonded in the rotor body using an epoxy and/or other suitable adhesive which may pose further difficulties in deconstructing the rotor.

In the illustrated example, the permanent magnets 106 include six magnets. In other examples, the permanent magnets 106 may include more or less than six magnets depending on the design of the rotor 102. The magnets may be arranged circumferentially and positioned proximate to a circumferential surface 110 of the rotor body 104. In some examples, consecutive magnets may be evenly spaced apart.

During the demagnetization process, the rotor 102 is positioned within the demagnetization system 100. To elaborate, the rotor 102 may be mounted on a shaft 124 that is positioned in the center of the demagnetization system 100. The shaft 124 may be configured to rotate, in one example. A motor, or other suitable device may be used to rotate the shaft 124. The demagnetization system 100 may include magnetic poles 108. The magnetic poles may be arranged circumferentially and positioned proximate to an outer side of the circumferential surface 110 of the rotor body 104. As such, the magnetic poles may at least partially surround the rotor body 104. Further, one surface of each magnetic pole may be tangentially aligned with the circumferential surface 110. Each magnetic pole may be positioned opposite another magnetic pole. Further, in some examples, consecutive magnetic poles may be evenly spaced apart (e.g., the magnetic pole 109 may be equally as far from two adjacent magnetic poles). In other examples, the magnetic poles 108 may be arranged in another suitable orientation such that the demagnetization system 100 may at least partially surround the rotor 102. The magnetic poles 108 may be mounted on a frame 122 which may be included in a fixture 123, and the position of each magnetic pole may be adjusted in relation to the frame. The frame 122 may have a circular or polyhedral shape, for instance.

A magnetic pole 109 may be adjusted axially along an axis 128 (e.g., along the length of the rotor 102) and/or radially along an axis 126. Similarly, each of the magnetic poles 108 may be adjusted along an axial and/or radial axis. Such adjustments of the magnetic poles allow the demagnetization system 100 to accommodate and demagnetize many different rotors with various designs and/or dimensions. In this way, the demagnetization system 100 may be used for a wide range or rotor types, thereby expanding the system's applicability. The position of the magnetic poles may be adjusted prior to attachment of the rotor 102 to the shaft 124.

Each magnetic pole in the magnetic poles 108 may include permanent magnets 112. The permanent magnets 112 may be oriented with their magnetic poles (e.g., a north pole and a south pole) facing the same direction. As such, the permanent magnets may constructively generate a DC magnetic field. Adjacent poles may be oriented in opposite directions. The magnet may be segmented. To elaborate, the magnet may be divided into smaller pieces along radial or axial directions.

The segmented pieces can be bonded/separated using insulating layers 116. Insulating layers 116 may be positioned between the permanent magnets 112. The insulating layers may be adhesively bonded or otherwise suitably attached to the magnets. The insulating layers act to decrease the eddy current in the permanent magnets. However, other suitable magnetic pole constructions have been contemplated.

The magnetic poles 108 generate a collective DC electromagnetic field for demagnetizing the rotor 102, and more specifically the permanent magnets 106. To elaborate, the rotor 102 may be rotated around an axis 130 on the shaft 124 within the demagnetization system 100 to induce demagnetization of the rotor, and more specifically demagnetization of the permanent magnets 106. As the rotor 102 and the shaft 124 rotate around the axis 130 within the demagnetization system, the orientation of the DC electromagnetic field relative to each magnet changes over time. A number of magnetic dipoles of each magnet may be reoriented by the DC electromagnetic field at different points in time, resulting in a randomization of magnetic dipoles within each magnet, and therefore a loss of magnetization. Further, in another example, the magnetic poles 108 may include two or more layers of magnetic poles along the axial direction.

During the demagnetization process (which may include rotation of the rotor 102 within the demagnetization system 100), one or more of the magnetic poles 108 may be adjusted axially and/or radially. In some examples, the position of the magnetic poles may be adjusted based on the flux density of the rotor 102. For example, the magnetic poles may be adjusted radially to adjust the strength of the magnetic field being experienced by the permanent magnets 106. Further, the magnetic poles may be adjusted axially such that all portions of the rotor 102 may be accommodated within the demagnetization system at some point in time. As such, the demagnetization system 100 may efficiently demagnetize rotors with a variety of designs.

A controller 113 may form a portion of a control system 117. The control system 117 is shown receiving information from sensors 115 and sending control signals to actuators 181. As one example, the sensors 115 may include sensors such as a rotational speed sensor, a flux density sensor, etc. The actuators 181 may include actuators 182 for adjusting the radial position of the magnetic poles 108, actuators 183 for adjusting the axial position of the shaft 124 and therefore the rotor 102. The controller 113 may receive input data from the sensors, process the input data via a processor, and trigger the actuators in response to the processed input data based on instruction or code programmed therein corresponding to one or more routines. In some examples, the controller 113 may include instructions that send a command signal to an actuator of the demagnetization system 100 to adjust the radial position of the magnetic poles based on the measured flux density of the rotor 102.

The flux density of the rotor 102 may be measured by a sensor 118 that may be included in the sensors 115. As illustrated in FIG. 1, the sensor 118 may be positioned proximate to an outer side of the circumferential surface 110 of the rotor body 104. Further, the sensor 118 may be a fluxmeter or another suitable device for measuring flux density. The controller 113 may receive signals from the sensor 118 and may employ actuators 182, 183 to adjust the positions of the magnetic poles 108 based on the signals received and instructions stored on a memory of the controller 113.

The axial and/or radial position of the magnetic poles may be adjusted prior to attaching the rotor to the shaft 124 which allows the system to be configured for differently shaped rotors, as discussed above. Additionally, in certain examples, the axial and/or radial position of the magnetic poles may be dynamically adjusted during demagnetization. To elaborate, as the flux density of the rotor 102 decreases, the actuators 182 may radially adjust the position of the magnetic poles 108 to move it further away from the rotor 102 to gradually reduce the demagnetizing field on the magnets. This movement may be continuous and the demagnetization process may be finished in seconds, in one use-case example. Further, the shaft 124 may also be dynamically adjusted as it moves the rotor in and out of the demagnetization system. When the rotor is gradually moved out, the magnetic field from the demagnetization system may also decay gradually, which has the same effect as moving the poles along radial direction.

Adjusting the radial and/or axial position of a magnetic pole may include adjusting an actuator coupled to the magnetic pole. In some examples, mechanical pistons, hydraulics, combinations thereof, or the like may automatically actuate the adjustment of the magnetic poles. In other examples, an operator may manually adjust the position of the magnetic poles by adjusting screws and the like. The control system 117 is additionally shown in FIG. 4 and may be used in conjunction with the demagnetization system illustrated therein and described in greater detail herein.

As shown in FIG. 1, the rotational speed of the rotor 102 may be measured by a sensor 120 that may be included in the sensors 115. The sensor 120 may be positioned proximate to an outer side of the circumferential surface 110 of the rotor body 104. The rotational speed may be adjusted during the demagnetization process based on the flux density measured by the sensor 118. For example, the rotational speed of the rotor 102 may be decreased as the flux density of the rotor decreases. The controller 113 may receive signals from the sensor 118 and the sensor 120 and may employ actuators 181 to adjust the rotational speed of the shaft 124, and therefore the rotor, based on the signals received and instructions stored on a memory of the controller 113. For example, adjusting the rotational speed of the shaft 124 may include adjusting an actuator that controls a motor which is responsible for the rotation of the shaft. Further, the rotation of the shaft and rotor may be ceased in response to the flux density of the rotor dropping below a threshold value.

FIG. 2 illustrates a second rotor 202 including a rotor body 204 and magnets 206. In the illustrated example, the second rotor 202 is larger in diameter than the rotor 102 of FIG. 1, and as such, the rotor body 204 is larger than the rotor body 104 of the rotor 102. Further, the second rotor includes a greater number of the magnets 206. The magnets 206 may be oriented circumferentially and positioned proximate to a circumferential edge 210 of the rotor body 204. As indicated above, the demagnetization system 100 is able to be efficiently reconfigured to accommodate for rotors with a wide variety of sizes, profiles, etc.

As illustrated, the second rotor 202 is positioned within the demagnetization system 100. Further, the second rotor 202 is mounted on the shaft 124 that is positioned in the center of the demagnetization system 100. The demagnetization system 100 includes the magnetic poles 108, the frame 122, the control system 117, the sensor 118, the sensor 120, and the actuators 182. In order to accommodate the second rotor 202 that is larger than the rotor 102, the magnetic poles 108 are radially adjusted away from the shaft 124, which provides more space within the demagnetization system 100 for the second rotor 202. In some examples, the magnetic poles may be adjusted axially in order to accommodate one or more structural features of the second rotor. For example, the magnetic pole 109 may be adjusted along the axis 128 to a position that accommodates the second rotor. In this way, the magnetic poles 108 may still be positioned proximate to an outer side of the circumferential edge 210 of the rotor body 204. The magnetic poles 108 may have been radially adjusted to accommodate the second rotor 202 by the actuators 182, as described in reference to FIG. 1.

FIG. 3 illustrates the magnetic pole 109 of the demagnetization system 100 of FIGS. 1 and 2. As described in reference to FIG. 1, the magnetic pole 109 may include permanent magnets 112 and the insulating layers 116 may be positioned intermediate the permanent magnets 112. The use of permanent magnets and one or more insulating layers in the magnetic pole may allow the magnetic pole to be heated up slower and therefore retain more power and durability. More dedicated magnet arrangement (e.g., a Halbach array) can also focus the field and increase the field strength with the same magnet volume or make the magnet assembly more compact than single piece magnet poles and magnetic poles including coils.

FIG. 4 illustrates an example of a demagnetization system 400, which is similar to the demagnetization system 100. As such, overlapping components of the demagnetization system 400 and the demagnetization system 100 may be similarly numbered. FIG. 4 further illustrates the rotor 102. The rotor 102 may be positioned on the shaft 124 of the demagnetization system 400. The demagnetization system 400 includes magnetic poles 408. In the illustrated example, each of the magnetic poles 408 include a coil 402 and metal laminations 404 (e.g., steel laminations) as opposed to the permanent magnets and insulating layer described with respect to the magnetic poles 108.

The magnetic poles 408 illustrated in FIG. 4 may each generate a DC electromagnetic field or an AC electromagnetic field when supplied with DC or AC, respectively. As such, the magnetic poles 408 may generate a collective DC electromagnetic field or a collective AC electromagnetic field for demagnetizing the rotor 102, and more specifically the permanent magnets 106.

The demagnetization system 400 may generate a DC electromagnetic field when supplied with direct current. In some examples, the rotor 102 may be rotated by the shaft 124 around the axis 130 (e.g., the longitudinal axis of the rotor) within the demagnetization system 400 to induce demagnetization of the rotor (e.g., the permanent magnets 106). As the shaft and the rotor rotate around the axis 130 within the demagnetization system, the orientation of the DC electromagnetic field relative to each of the magnets changes over time. A number of magnetic dipoles of each magnet may be reoriented with the DC electromagnetic field at different points in time, resulting in a randomization of magnetic dipoles within each magnet, and therefore a decrease in magnetization. During demagnetization of the rotor 102 by a DC electromagnetic field, the position of the magnetic poles 408 may be adjusted radially and/or axially and the rotational speed of the rotor may be adjusted as described in reference to FIG. 1. For example, the magnetic pole 409 may be adjusted axially along an axis 412 and/or radially along an axis 410. Further, the rotational speed of the shaft 124, and therefore the rotor 102, may be adjusted by one or more actuators of the control system 117 based at least in part on the flux density of the rotor. As such, the demagnetization system 400 may be adjusted to accommodate various dimensions and design features of the rotor.

Additionally or alternatively, the demagnetization system 400 of FIG. 4 may generate an AC electromagnetic field when supplied with AC. The AC electromagnetic field induces demagnetization of a static object. As such, the shaft 124 and the rotor 102 may remain stationary within the demagnetization system 100 during demagnetization of the permanent magnet rotor when the magnetic poles 408 generate AC. As the rotor is stationary within the demagnetization system, the AC electromagnetic field changes direction and magnitude continuously with time. The changing nature of the AC electromagnetic field may randomly reorient magnetic dipoles of each magnet leading to a loss of magnetization. In some examples, the magnetic poles 408 may be supplied with discrete pulses of electric current instead of a continuous supply of alternating current.

Similar to demagnetization with a DC electromagnetic field, one or more of the magnetic poles 408 may be adjusted axially and/or radially during demagnetization with an AC electromagnetic field. As such, the controller 113 may include instructions that send a command signal to the actuators 182 of the demagnetization system 400 to adjust the radial position of one or more of the magnetic poles 408 based on measurements taken by the sensors 115 (e.g., the sensor 118 and/or the sensor 120). For example, as the flux density of the rotor 102 decreases, the actuators 182 may radially adjust the position of the magnetic poles 408 to be further from the rotor. Further, the actuators may axially adjust the magnetic poles as the rotor rotates in order to efficiently demagnetize all portions of the rotor.

Additionally, the AC, and in some examples the pulse current, may be adjusted during demagnetization of the rotor 102. The supplied AC may be adjusted during the demagnetization process based on the flux density measured by the sensor 118. For example, the magnitude of the AC may be decreased as the flux density of the rotor decreases. For instance, adjusting the AC may include adjusting a circuit that controls an electrical source responsible for supplying current to the demagnetization system 400. Further, current through the coil of each magnetic pole may be discontinued in response to the flux density of the rotor dropping below a threshold value. It will be understood, that as described herein a magnet may be demagnetized when the magnetic flux density of the magnet drops below a threshold value which may be non-zero in some examples, and may not be zero for recycling purpose. As such, a magnet may be indicated as being demagnetized even though its magnetic flux density may be greater than zero. However, it will be understood that the demagnetization system may demagnetize magnets such that the flux density is zero or approaching zero, in some cases.

FIG. 5 illustrates the magnetic pole 409 of the demagnetization system 400 of FIG. 4, including the coil 402 and the steel laminations 404. The coil 402 may be a helical coil of wire with a length that is greater than its diameter (e.g., a solenoid). In some examples, the coil 402 may be constructed of copper and/or other suitable material. Further, the coil may have an axis 406 that may be oriented tangentially to a closest point of the circumferential surface 110 of the rotor body 104 (e.g., parallel to the x-axis). When provided with electrical current, the coil may generate an electromagnetic field. Similarly, each of the magnetic poles 408 may generate an electromagnetic field via a coil when provided with electrical current.

Each of the magnetic poles 408 may include steel laminations 404. The steel laminations 404 include multiple layers which may be formed of electric steel, in one example. In one specific example, the steel laminations may be constructed of high silicon steel. The coil 402 may be positioned around at least a portion of the steel laminations 404. Further, the steel laminations include multiple sheets of steel, as illustrated in FIG. 5. The steel laminations are configured to reduce eddy current losses.

Figure 6:
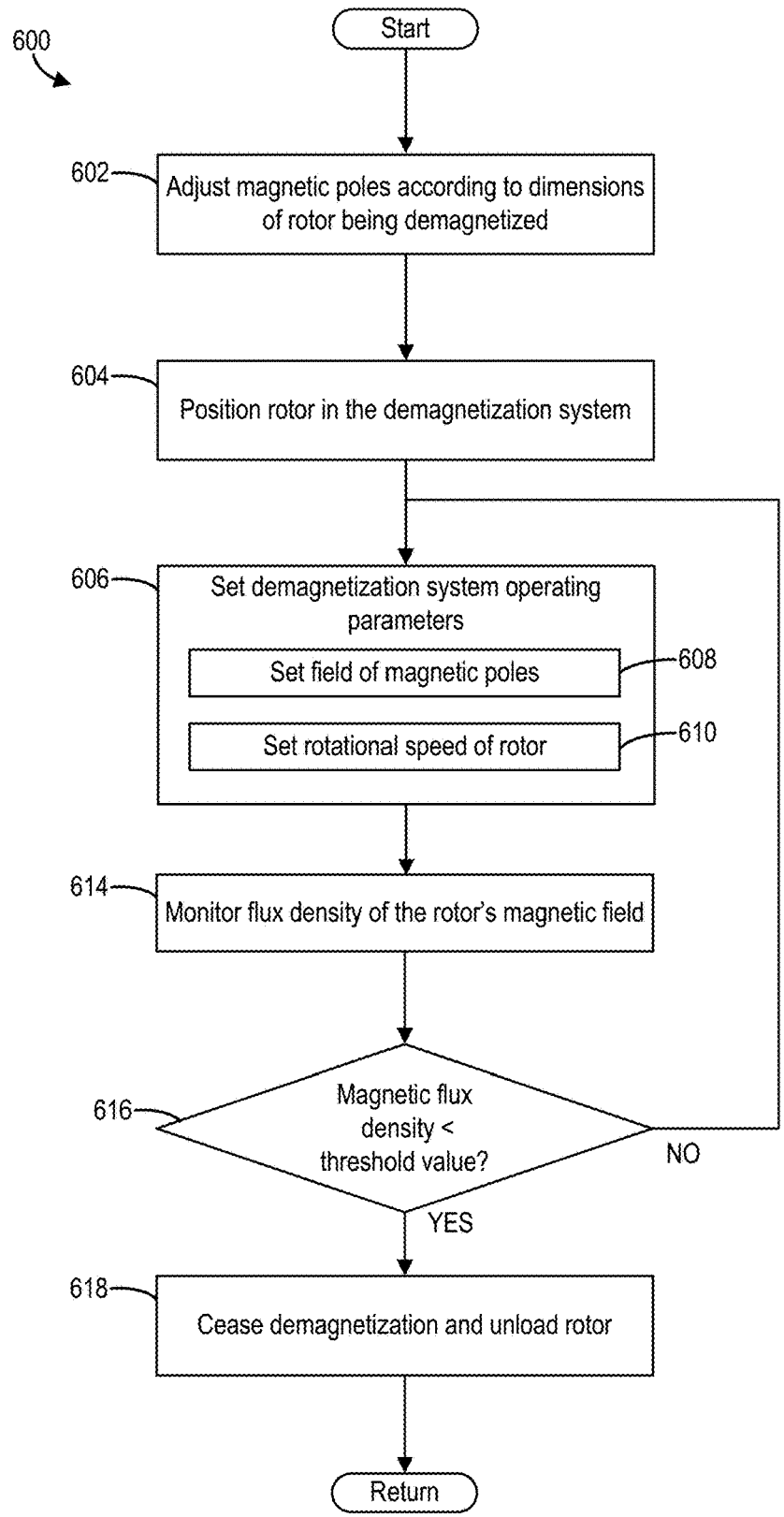
FIG. 6 shows a method for demagnetizing a rotating rotor.

FIG. 6 illustrates a method 600 for demagnetizing a rotating rotor with a demagnetization system. The method 600 and the other methods described herein may be implemented by the demagnetization system 100 shown in FIG. 1, the demagnetization system 400 shown in FIG. 4, or a combination of the systems. However, the method 600 and/or the other method described herein may be implemented by other suitable demagnetization systems, in alternate examples. Instructions for carrying out the method 600 and the rest of the methods included herein may be executed by a controller based on instructions stored on a memory of the controller and in conjunction with signals received from sensors of a demagnetization system. The controller may employ actuators of the demagnetization system to adjust operation of the demagnetization system, according to the methods described below.

At 602, the method 600 includes adjusting magnetic poles of the demagnetization system according to the dimensions of the rotor being demagnetized. Magnetic poles of the demagnetization system may be adjusted radially, with respect to the rotor. To elaborate, the magnetic poles may be adjusted radially so that each magnetic pole is positioned proximate to an outer surface of the rotor. The ability of the magnetic poles to be radially adjusted allows the demagnetization system to be utilized with many different rotors, each having various dimensions and designs, thereby expanding the system's applicability and appeal.

At 604, the method 600 includes positioning the rotor in the demagnetizing system. For instance, the rotor may be coupled to the system's shaft. Once rotor is coupled to the shaft, the rotor may be axially translated into a desired position. In this way, the axial position of the rotor may be adjusted to accommodate for differently shaped rotors. However, in other examples, the axial position of the shaft (which determines the axial position of the rotor) may be adjusted at step 602. The rotor may be positioned such that the magnetic poles are positioned circumferential and proximate to an outside surface of the rotor.

At 606, the method 600 includes setting the operating parameters of the demagnetization system. Setting the operating parameters includes at 608, setting the field of the magnetic poles of the demagnetization system. As indicated above, the DC electromagnetic field generated by the demagnetization system may be adjusted by adjusting the magnitude of the DC current that is supplied to the coils of the magnetic poles. As such, the strength of the DC electromagnetic field may be set by supplying direct current of a specific magnitude to each coil of the demagnetization system based on the current flux density of the rotor. To elaborate, the operating parameters may include the amount of current transferred to the magnetic poles, the rotating speed of the rotor and shaft, the duration and frequency of the electromagnetic field, and/or the radial position of the magnetic poles. In case of magnet poles, the pole may be set to be the closest position to the rotor surface, and the rotating speed of shaft would be increased gradually until the rotor flux surface magnitude start to decline, and then the pole may be adjusted gradually to decrease the field on the magnet. Alternatively, the shaft may move along the axial direction, and the magnetic field on the magnet may also be decreasing gradually when the rotor is being moved out of the fixture.

Setting the operating parameters of the demagnetization system includes setting the rotational speed of the rotor, as indicated at 610. As discussed above, the rotor may rotate on a shaft within the DC electromagnetic field in order for the rotor to be demagnetized. As such, the rotational speed of the shaft and the rotor may be set by a mechanical power source (e.g., a motor) based on the current flux density of the rotor. For example, the shaft may rotate slower as the flux density of the rotor decreases.

At 614, the method 600 includes monitoring the flux density of the rotor magnetic field. Specifically, in one example, the flux density may be monitored after each rotation of the rotor. However, in other examples, the flux density may be monitored after multiple cycles. As the rotor is demagnetized, the magnetic field generated by the magnets decreases in strength. The strength of rotor flux density may be monitored by one or more sensors of the demagnetization system. In some examples, the sensors may be positioned proximate an outer surface of the rotor. Further, in some examples, the sensors may each be a fluxmeter or other suitable piece of hardware for measuring flux density.

At 616, the method 600 includes determining if the magnetic flux density of the rotor is less than a threshold value. The control system determines if the measured flux density is below a predetermined threshold value. The threshold value may be determined based on the rotor design, type of magnets within the rotor, demands of the downstream magnet processing, etc. In some examples, the threshold may be in a range of 0-0.1 T or may be expressed as a relative value (e.g., 10% of the original strength, in one use-case example).

If the magnetic flux of the rotor is not below the threshold value (NO in FIG. 6), the method 600 returns to 606. After the method returns to 606, the amount of current provided to the magnetic poles, the rotating speed of the rotor, and/or the duration of the current is increased.

If the magnetic flux of the rotor after a rotation is below the threshold value (YES in FIG. 6), the method 600 continues to 618. At 618, the method 600 includes ceasing demagnetization and unloading the rotor. If the demagnetization system is utilizing coils and metal lamination, as illustrated in FIG. 4, DC current may no longer be supplied to the coils of the magnetic poles. If the demagnetization system is utilizing permanent magnets, the magnetic poles may be translated radially and/or axially away from the rotor. Further, the rotor may be axially translated out of the demagnetization system (e.g., unloaded from the system).

Once removed from the demagnetization system, the rotor may be dissembled and recycled.

Figure 7:
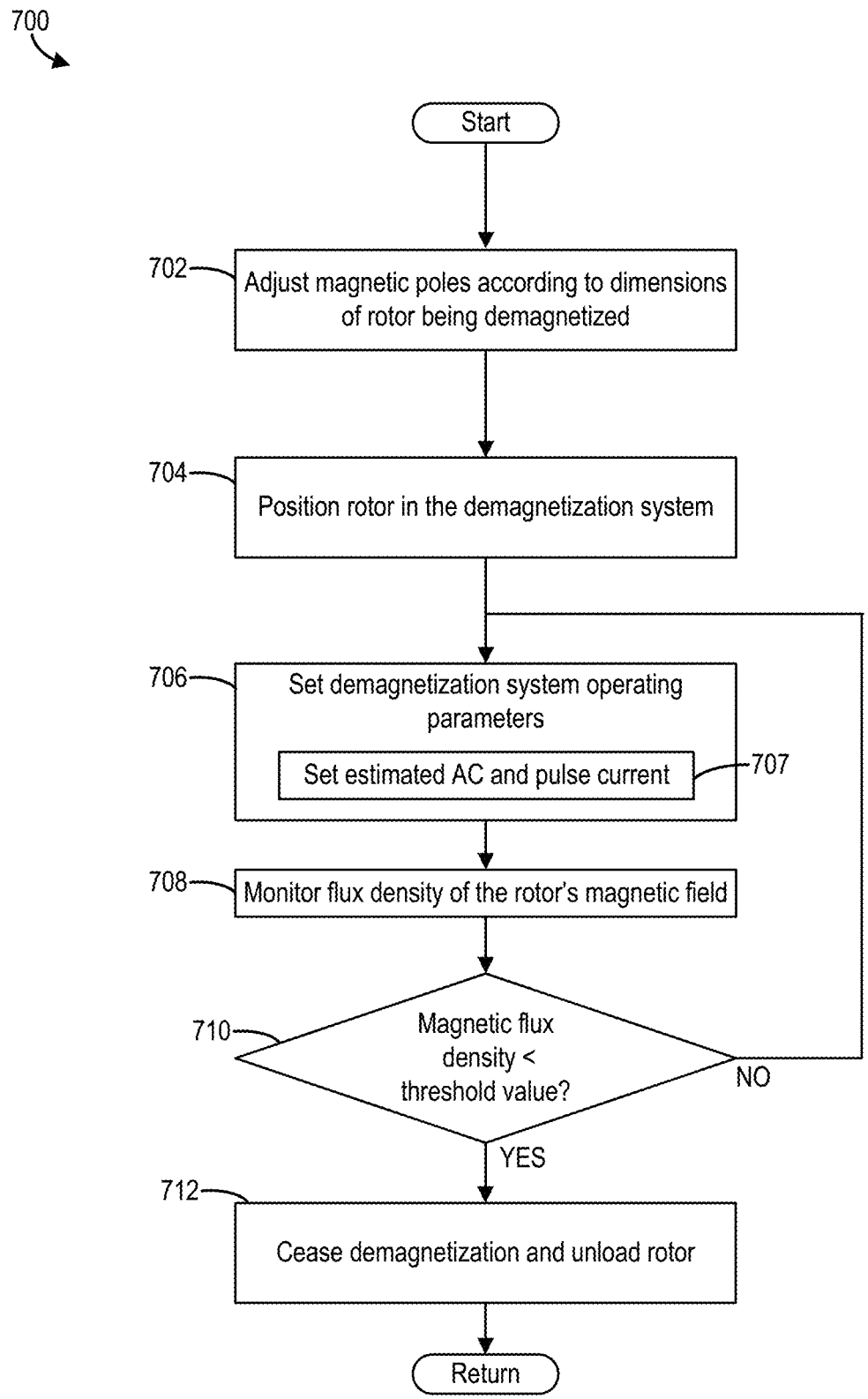
FIG. 7 shows a method for demagnetizing a stationary rotor.

FIG. 7 illustrates a method 700 for demagnetizing a static (non-rotating) rotor with a demagnetization system. At 702, the method 700 includes adjusting magnetic poles of a demagnetization system according to the dimensions of a rotor being demagnetized. At 704, the method 700 includes positioning the rotor in the demagnetizing system. 702 and 704 may be identical to 602 and 604 of FIG. 6, respectively.

At 706, the method 700 includes setting the demagnetization operating parameters. Setting the operating parameters may include at 707, setting the estimated AC and pulse current. As explained in reference to FIG. 4, an AC electromagnetic field generated by the demagnetization system may be adjusted by adjusting the magnitude and/or direction of alternating current that is supplied to the coil of each magnetic pole. As such, the strength of the AC electromagnetic field may be set by supplying alternating current of a specific magnitude to each coil of the demagnetization system based on the current flux density of the rotor. For example, less alternating current may be provided to the coils, and therefore the AC electromagnetic field may become weaker, as the flux density of the motor decreases. In some examples, the coils may be supplied with pulse current (e.g., discrete pulses of current) instead of continuous alternating current. The magnitude and/or frequency of the pulse current may be set at 706.

At 708, the method 700 includes monitoring the flux density from the rotor magnetic field. While magnetized, the magnets within the rotor generate a magnetic field. As the rotor is demagnetized, the magnetic field generated by the magnets decreases. The strength of magnetic field generated by the rotor may be measured as flux density by one or more sensors of the demagnetization system. In some examples, the sensors may be positioned proximate an outer surface of the rotor. Further, in some examples, the sensors may each include a fluxmeter or other suitable piece of hardware for measuring flux density.

At 710, the method 700 includes determining if the magnetic flux density or the equivalent quantity of the rotor is less than a threshold value. The threshold value may be determined based on rotor design, type of magnets within the rotor, etc. If the magnetic flux density of the rotor is not below the threshold value (NO in FIG. 7), the method 700 returns to 706. After the method returns to 706, the amount of current provided to the magnetic poles, the frequency of the current, and/or the duration of the current is increased.

If the magnetic flux of the rotor is below the threshold value (YES in FIG. 7), the method 700 continues to 712. At 712, the method 700 includes ceasing demagnetization and unloading the rotor. To elaborate, the current supplied to the coils of each magnetic pole is discontinued. Further, the rotor may be axially translated out of the demagnetization system (e.g., unloaded from the system). Once removed from the demagnetization system, the rotor may be subsequently dissembled and recycled.

In this way, systems and methods are proposed to demagnetize permanent magnets in a rotor without the rotor being disassembled beforehand. A demagnetization system may be used to demagnetize different permanent magnet rotors with various designs and dimensions. The demagnetization system may be set up to generate an electromagnetic field around the rotor, where the electromagnetic field may be an AC or a DC electromagnetic field. An AC electromagnetic field may be generated by the demagnetization system while the rotor is stationary, or a DC electromagnetic field may be generated by the demagnetization system while the rotor is rotating. An induced eddy current in the permanent magnets of the rotor due to the electromagnetic field may heat (e.g., inductively heat) the magnets and decreases coercivity, allowing each magnet to be demagnetized via a weaker electromagnetic field/current. Additionally, the heat generated by the eddy current induced via the demagnetization system may soften any epoxy around the permanent magnets of the rotor, which may further facilitate the removal of the magnets from the rotor core. Compared to other approaches, the systems and methods described herein result in a higher demagnetization efficiency as well as increased system applicability due to the ability of the system to accommodate and demagnetize different rotors (e.g., motors) with various designs.

The technical effect of the methods described herein is to efficiently demagnetize rotors with a variety of shapes and sizes.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a method is provided that includes adjusting a position of a plurality of magnetic poles in a demagnetization system in relation to a first electric machine rotor, and decreasing a magnetic flux of the first electric machine rotor via operation of the demagnetization system to generate an electromagnetic field, where the plurality of magnetic poles are positioned on a frame. In a first example of the method, operating the demagnetization system to generate the electromagnetic field includes rotating the first electric machine rotor in a static electromagnetic field. In a second example of the method, optionally including the first example, the method further includes monitoring a flux density of the first electric machine rotor, and adjusting a current, a frequency, or a duration of the electromagnetic field that is generated by the demagnetization system based on the flux density. In a third example of the method, optionally including one or both of the first and second examples, adjusting the current, the frequency, or the duration of the electromagnetic field includes increasing the current, the frequency, or the duration of the electromagnetic field in response to the flux density exceeding a threshold value, and discontinuing generation of the electromagnetic field in response to the flux density decreasing below the threshold value. In a fourth example of the method, optionally including one or more or each of the first through third examples, the position of the plurality of magnetic poles may be adjusted prior to generating of the electromagnetic field and the position may be a radial position. In a fifth example of the method, optionally including one or more or each of the first through fourth examples, the position of the plurality of magnetic poles is dynamically adjusted during generation of the electromagnetic field. In a sixth example of the method, optionally including one or more or each of the first through fifth examples, the electromagnetic field is an alternating current (AC) field and the method further includes maintaining the first electric machine rotor stationary. In a seventh example of the method, optionally including one or more or each of the first through sixth examples, the electromagnetic field is a direct current (DC) field and the method further includes rotating the first electric machine rotor while the demagnetization system generates the DC field. In an eighth example of the method, optionally including one or more or each of the first through seventh examples, the method further includes monitoring a flux density of the first electric machine rotor, and adjusting the rotor speed, the electromagnetic field current, or the electromagnetic field frequency based on the flux density. In a ninth example of the method, optionally including one or more or each of the first through eighth examples, the method further includes adjusting the position of the plurality of magnetic poles in relation to a second electric machine rotor, and decreasing a magnetic flux of the second electric machine rotor via operation of the demagnetization system to generate the electromagnetic field, where the first electric machine rotor and the second electric machine rotor have a different size and/or permanent magnet configuration.

In another example, a demagnetization system is provided that includes a frame, a plurality of magnetic poles adjustably attached to the frame, and a controller including instructions stored on non-transitory memory that when executed cause the controller to decrease a magnetic flux of a first electric machine rotor via operation of the demagnetization system to generate an electromagnetic field. In a first example of the demagnetization system, the plurality of magnetic poles each include permanent magnets. In a second example of the demagnetization system, optionally including the first example, the controller further includes instructions stored on the non-transitory memory that when executed cause the controller to dynamically adjust a position of the plurality of magnetic poles in relation to a first electric machine rotor. In a third example of the demagnetization system, optionally including one or both of the first and second examples, the dynamic adjustment is an axial adjustment. In a fourth example of the demagnetization system, optionally including one or more or each of the first through third examples, the dynamic adjustment is a radial adjustment. In a fifth example of the demagnetization system, optionally including one or more or each of the first through fourth examples, the plurality of magnetic poles each include a stack of steel laminations and coils. In a sixth example of the demagnetization system, optionally including one or more or each of the first through fifth examples, the steel laminations are silicon steel laminations. In a seventh example of the demagnetization system, optionally including one or more or each of the first through sixth examples, the plurality of magnetic poles each include a plurality of permanent magnets and at least one insulating layer positioned between the plurality of permanent magnets.

In yet another example, a method is provided that includes adjusting an axial or a radial position of a plurality of magnetic poles in a demagnetization system in relation to a first electric machine rotor, and decreasing a magnetic flux of the first electric machine rotor via operation of the demagnetization system to generate an electromagnetic field, where the plurality of magnetic poles are positioned on a frame. In a first example of the method, the electromagnetic field is an alternating current (AC) field and the method further includes maintaining the first electric machine rotor stationary, or the electromagnetic field is a direct current (DC) field and the method further includes rotating the first electric machine rotor while the demagnetization system generates the DC field.

Note that the example control and estimation routines included herein can be used with various demagnetization system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting a position of a plurality of magnetic poles in a demagnetization system in relation to a first electric machine rotor; and
decreasing a magnetic flux of the first electric machine rotor via operation of the demagnetization system to generate an electromagnetic field;
where the plurality of magnetic poles are positioned on a frame.

2. The method of claim 1, where operating the demagnetization system to generate the electromagnetic field includes rotating the first electric machine rotor in a static electromagnetic field.

3. The method of claim 1, further comprising:
monitoring a flux density of the first electric machine rotor; and
adjusting a current, a frequency, or a duration of the electromagnetic field that is generated by the demagnetization system based on the flux density.

4. The method of claim 3, where adjusting the current, the frequency, or the duration of the electromagnetic field includes:
increasing the current, the frequency, or the duration of the electromagnetic field in response to the flux density exceeding a threshold value; and
discontinuing generation of the electromagnetic field in response to the flux density decreasing below the threshold value.

5. The method of claim 1, where the position of the plurality of magnetic poles is adjusted prior to generating of the electromagnetic field and the position is a radial position.

6. The method of claim 1, where the position of the plurality of magnetic poles is dynamically adjusted during generation of the electromagnetic field.

7. The method of claim 1, where the electromagnetic field is an alternating current (AC) field and the method further comprises maintaining the first electric machine rotor stationary.

8. The method of claim 1, where the electromagnetic field is a direct current (DC) field and the method further comprises rotating the first electric machine rotor while the demagnetization system generates the DC field.

9. The method of claim 8, further comprising:
monitoring a flux density of the first electric machine rotor; and
adjusting a rotor speed, an electromagnetic field current, or an electromagnetic field frequency based on the flux density.

10. The method of claim 1, further comprising:
adjusting the position of the plurality of magnetic poles in relation to a second electric machine rotor; and
decreasing a magnetic flux of the second electric machine rotor via operation of the demagnetization system to generate the electromagnetic field;
where the first electric machine rotor and the second electric machine rotor have a different size and/or permanent magnet configuration.

11. A demagnetization system, comprising:
a frame;
a plurality of magnetic poles adjustably attached to the frame; and a controller including instructions stored on non-transitory memory that when executed cause the controller to:
  decrease a magnetic flux of a first electric machine rotor via operation of the demagnetization system to generate an electromagnetic field.

12. The demagnetization system of claim 11, where the plurality of magnetic poles each include permanent magnets.

13. The demagnetization system of claim 11, where the controller further includes instructions stored on the non-transitory memory that when executed cause the controller to:
  dynamically adjust a position of the plurality of magnetic poles in relation to the first electric machine rotor.

14. The demagnetization system of claim 13, where the dynamic adjustment is an axial adjustment.

15. The demagnetization system of claim 13, where the dynamic adjustment is a radial adjustment.

16. The demagnetization system of claim 11, where the plurality of magnetic poles each include a stack of steel laminations and coils.

17. The demagnetization system of claim 16, where the steel laminations are high silicon steel laminations.

18. The demagnetization system of claim 11, where the plurality of magnetic poles each include a plurality of permanent magnets and at least one insulating layer positioned between the plurality of permanent magnets.

19. A method comprising:
  adjusting a radial position of a plurality of magnetic poles in a demagnetization system in relation to a first electric machine rotor; and
  decreasing a magnetic flux of the first electric machine rotor via operation of the demagnetization system to generate an electromagnetic field;
  where the plurality of magnetic poles are positioned on a frame.

20. The method of claim 19, where:
  the electromagnetic field is an alternating current (AC) field and the method further comprises maintaining the first electric machine rotor stationary; or
  the electromagnetic field is a direct current (DC) field and the method further comprises rotating the first electric machine rotor while the demagnetization system generates the DC field.

\* \* \* \* \*